United States Patent
Gopalakrishnan et al.

(10) Patent No.: US 10,936,723 B2
(45) Date of Patent: Mar. 2, 2021

(54) FAST AND SECURE PROTOCOL TO BOOTSTRAP A BLOCKCHAIN BY RESTORING THE BLOCKCHAIN STATE USING TRUSTED EXECUTION ENVIRONMENT

(71) Applicant: Intel Corporation, Santa Clara, CA (US)

(72) Inventors: Manoj Gopalakrishnan, Bangalore (IN); Ashish Kumar Mishra, Odisha (IN); Amol Kulkarni, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 133 days.

(21) Appl. No.: 16/365,722

(22) Filed: Mar. 27, 2019

(65) Prior Publication Data
US 2019/0220603 A1    Jul. 18, 2019

(51) Int. Cl.
| G06F 9/00 | (2006.01) |
| G06F 21/57 | (2013.01) |
| H04L 9/00 | (2006.01) |
| H04L 29/06 | (2006.01) |
| G06F 9/4401 | (2018.01) |

(52) U.S. Cl.
CPC .......... G06F 21/575 (2013.01); G06F 9/4406 (2013.01); H04L 9/006 (2013.01); H04L 63/123 (2013.01); *G06F 9/4401* (2013.01); *G06F 2221/2149* (2013.01); *H04L 2209/38* (2013.01)

(58) Field of Classification Search
CPC .......... G06F 21/575; G06F 9/4406; G06F 2221/2149; H04L 9/006; H04L 63/123; H04L 2209/38

USPC .......... 713/2
See application file for complete search history.

(56) References Cited

U.S. PATENT DOCUMENTS

| | | | |
|---|---|---|---|
| 10,511,447 B1 * | 12/2019 | Lakk | H04L 9/3297 |
| 2002/0112157 A1 * | 8/2002 | Doyle | H04L 63/0823 |
| | | | 713/157 |
| 2015/0271183 A1 * | 9/2015 | MacGregor | G06Q 20/0655 |
| | | | 726/4 |
| 2016/0085955 A1 * | 3/2016 | Lerner | G06F 21/725 |
| | | | 726/20 |
| 2018/0241551 A1 * | 8/2018 | Fujimura | G06F 16/27 |
| 2018/0309567 A1 * | 10/2018 | Wooden | H04L 9/3239 |
| 2019/0156301 A1 * | 5/2019 | Bentov | G06Q 20/065 |
| 2019/0166116 A1 * | 5/2019 | Kumar | H04L 63/12 |

(Continued)

OTHER PUBLICATIONS

Mastering bitcoint (Year: 2014).*

*Primary Examiner* — Volvick Derose
(74) *Attorney, Agent, or Firm* — Kacvinsky Daisak Bluni PLLC

(57) ABSTRACT

A system and method are disclosed in which a node of a peer-to-peer (P2P) network supporting a blockchain is able to restart following network or power disruption (or is able to initially join the blockchain network) by bootstrapping information from one or more peer nodes in the P2P network. The bootstrapping operation involves communication between the Trusted Execution Environments (TEEs) of the two or more nodes. The system and method ensure that the retrieval of data related to the blockchain state are not from untrusted parts of the peer node(s) and the data has not been tampered with (avoidance of replay attacks).

20 Claims, 14 Drawing Sheets

(56) References Cited

U.S. PATENT DOCUMENTS

2019/0199787 A1\* 6/2019 Carver ................. H04L 67/108
2019/0238340 A1\* 8/2019 Wang .................... H04L 9/3247
2020/0013050 A1\* 1/2020 Finlow-Bates .... G06Q 20/3825
2020/0082405 A1\* 3/2020 Li ........................ H04L 9/3247

\* cited by examiner

FAST AND SECURE PROTOCOL TO BOOTSTRAP A BLOCKCHAIN BY RESTORING THE BLOCKCHAIN STATE USING TRUSTED EXECUTION ENVIRONMENT

TECHNICAL FIELD

This application relates to blockchain and, more particularly, to maintaining the general ledger of the blockchain by a node.

BACKGROUND

Blockchain is a technology that originated in the cryptocurrency realm, but its usage may extend to many other arenas, from quality assurance to supply chain and financial sectors. Blockchain consists of a distributed ledger, which is essentially a database located on disparate nodes, known as a blockchain network. In general, the ledger is a series of sequential blocks. Each node maintains a copy of the distributed ledger, ensuring data integrity, auditability, redundancy, and so on.

The blockchain network uses a consensus algorithm to reach an agreement on the global state of the blockchain and also to elect the leader node which can publish blocks to extend the current chain of blocks. Every node in the blockchain network will maintain a copy of the global state (aka ledger state), the list of blocks, and validate all the transactions in the blocks.

Whenever a new node joins the network or an existing node rejoins the network after going down temporarily (due to network connectivity issues or machine reboot), the node has to synchronize the blockchain state with the other nodes in the network by downloading the missing blocks from its peers, validating all the transactions in the blocks and updating the global state. Until the state is synchronized, the node will not be able to participate in blockchain consensus and successfully publish new blocks to the blockchain. Downloading blocks, validating all transactions, and updating the global state could be a time-consuming operation taking hours depending on the size of the blockchain.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a system and method are disclosed in which a node of a peer-to-peer (P2P) network supporting a blockchain is able to restart following network or power disruption (or is able to initially join the blockchain network) by bootstrapping information from one or more peer nodes in the P2P network. The bootstrapping operation involves communication between the Trusted Execution Environments (TEEs) of the two or more nodes. The system and method ensure that 1) the retrieval of data related to the blockchain state are not from untrusted parts of the peer node(s) and 2) the data has not been tampered with (avoidance of replay attacks).

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Blockchain

A blockchain is a distributed ledger (also known as a general ledger) or database that is shared across a P2P network of computers, known as nodes. The nodes consist of computing devices, such as servers, workstations, or special-purpose computing devices. The nodes are interconnected as part of a communications network, such as the Internet, a Local Area Network (LAN), a Wide Area Network (WAN), and so on. Nevertheless, the nodes may be geographically distributed. By decentralizing the computers used to verify the database, the blockchain lacks a central authority over the ledger. The blockchain is thus a distributed database or distributed ledger of all the transactions stored inside its blocks.

Figure 1:
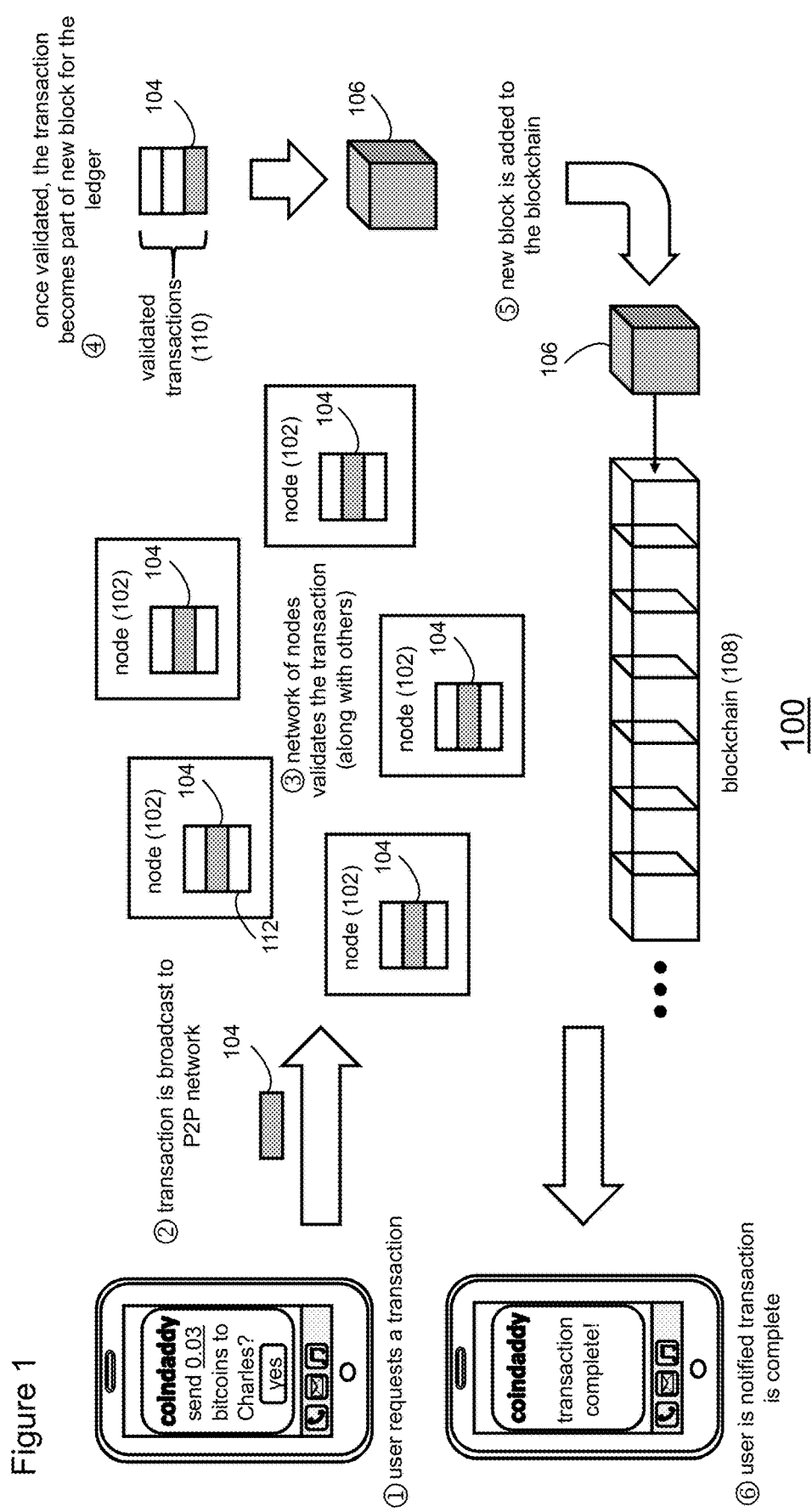
FIG. 1 is a simplified flow diagram of how a transaction is processed in a blockchain, in accordance with some embodiments.

FIG. 1 is a simplified flow diagram 100 of how a transaction is processed in a blockchain. A transaction 104 may be any of a variety of agreements made between two parties. A user is able to initiate a transaction from any of a variety of interfaces, such as a web page on the Internet. In this example, the user is transferring bitcoin using a website, Coindaddy, from a mobile device, but the blockchain is not limited to digital currency transactions.

Upon requesting a transaction 104 (1), the transaction is broadcast to the P2P network (2). Each node 102 of the P2P network receives a copy of the transaction 104 and adds the transaction to its queue 112 of transactions. The network of nodes validates the transaction (3), along with other transactions. The way in which the nodes perform the validation is beyond the scope of this disclosure and may vary, depending on the application of the blockchain. Once validated, the transaction, along with other validated transactions 110, becomes part of a new block 106 (4) for the blockchain ledger, also known as a general ledger or ledger state. The new block 106 becomes part of the blockchain 108 (5), which is known as publication of the block. At some point after the transaction 104 becomes part of the blockchain 108, the user is notified that the transaction is complete (6).

In practice, the new block 106 may be one of multiple competing blocks that want to be part of the blockchain. Thus, before becoming part of the blockchain 108, the block 106 is subjected to a consensus algorithm solved by a subset of the nodes of the P2P network. Thus, there may be some delay between the validation of the transaction and the publication of the block containing the transaction.

For the cryptocurrency bitcoin, which uses blockchain technology, the consensus algorithm is known as proof of work, which uses complex mathematical operations performed by the subset of nodes. There exist many other types of consensus algorithms, such as proof of stake, proof of elapsed time (PoET), proof of authority (PoA), and so on. Once the block passes the consensus algorithm by a majority of competing nodes, the block is added to the blockchain.

Cryptographic keys may be used to encrypt elements (including transactions) of the blocks. Corresponding cryptographic keys may enable decryption of the encrypted elements. For example, elements in a block may be encrypted with a symmetric key, and the same symmetric key may be available for decrypting the encrypted element. Or, the element may be encrypted with a public key while a corresponding private key is used to decrypt the encrypted element.

Except for the first block in the blockchain 108 (known as the genesis block), each block contains a hash of a previous block as well as a hash of the current contents of the block. The nodes of the P2P network further include (or may share) Trusted Execution Environment (TEE) enclaves which include hardware that secures some elements of the blockchain. The combination of the linking hashes, the consensus algorithm, and the TEE enclaves help to make the blockchain secure.

TEE Enclaves

The nodes of the P2P network supporting the blockchain may include an enclave. An enclave is a set of instructions, defined in a region of an application's address space, that is then protected by the hardware so that the operating system can manage these spaces but cannot access the data. These enclaves are sometimes called Trusted Execution Environments or TEEs. The TEEs are built by an application program in a system having the hardware to protect the TEE. For a typical blockchain use, either all nodes have a TEE or none of them have it. For blockchain implementations in which the nodes have TEEs, the TEE enclave is designed to protect secrets of the blockchain.

The TEE is an isolated environment that runs in parallel with the operating system. The TEE is protected by a hardware "root of trust", a set of private keys that are embedded into the chip during manufacture and a non-secret hash of a public key of the trusted party (such as the chip vendor) form the keypair used to sign trusted firmware alongside with the circuits doing crypto operations and controlling access. The hardware is designed to prevent software not signed by the key by the trusted party from accessing the privileged features.

Once the software is authenticated, trusted firmware is used to implement remote attestation, which is used to enable transmission of data between different devices. In remote attestation, a client authenticates its hardware and software configuration to a remote device, where the remote device is challenging the level of trust in the integrity of the platform of the client.

Figure 2:
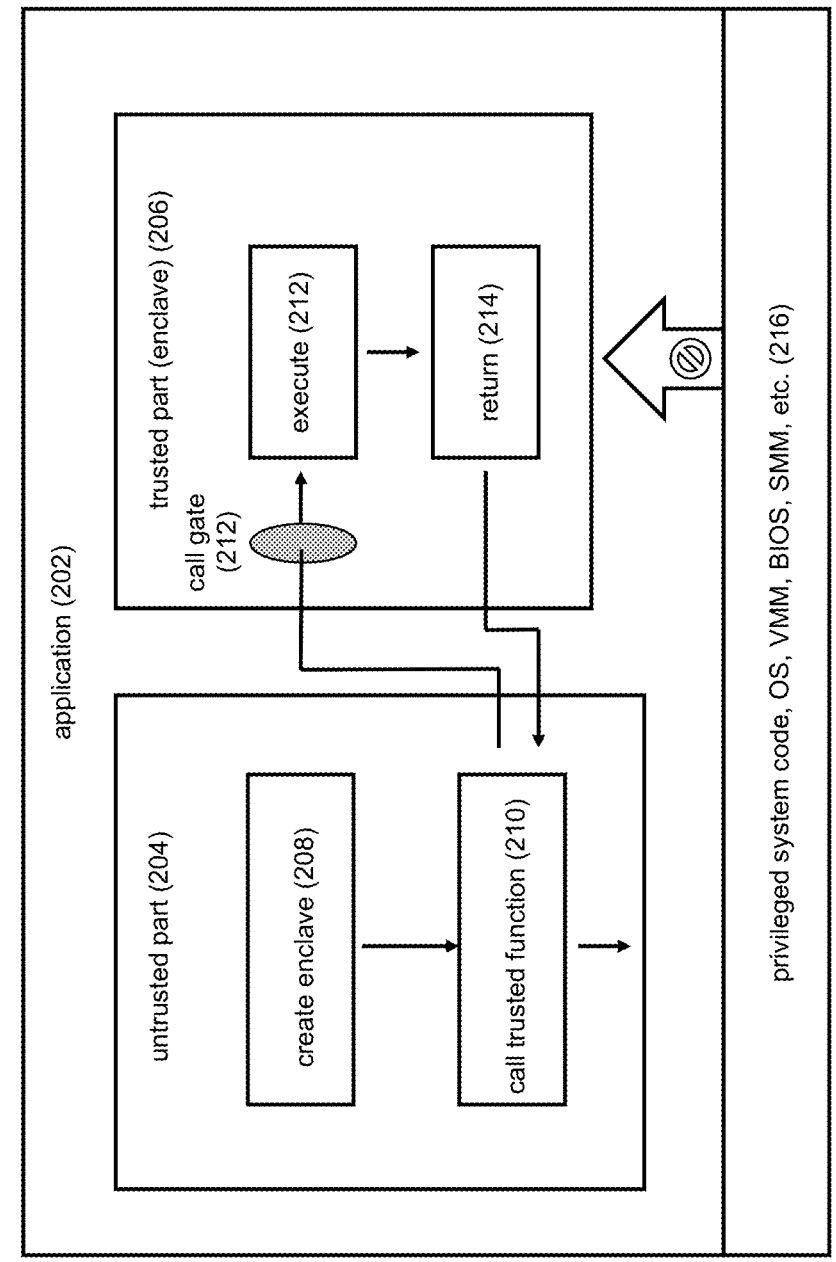
FIG. 2 is a simplified block diagram of a trusted execution environment known as SGX, including an untrusted part and a trusted part, in accordance with some embodiments.

A particular TEE, known as Software Guard Extension (SGX), for example, is a product of Intel Corporation. FIG. 2 is a simplified block diagram of an SGX environment 200 in which an application 202 includes an untrusted part 204 and a trusted part 206, the enclave. Calls are used to mediate communication between the trusted part 206 and the untrusted part 204.

The untrusted part of the application 204 actually generates the trusted part 206, where the trusted part 206 is placed in trusted memory. From the untrusted part 204, to create the enclave 208, a trusted function 210 is called through a call gate 212.

Once the enclave 206 is running, code running inside the enclave (execute 212) sees the data as clear text, and external access to the data is denied. The function returns (return 214), and the enclave data remains in trusted memory. Privileged system code, OS, VMM, BIOS, SMM, and so on, are unable to access the enclave 206.

In the description of the problem and possible solutions, below, reference will be made to untrusted and trusted parts of the node. For the trusted part, the enclave, ongoing assurance is needed that 1) the data it receives is coming from a trusted source, such as another enclave and 2) the data has not been tampered with.

Replay Attacks

Figure 3:
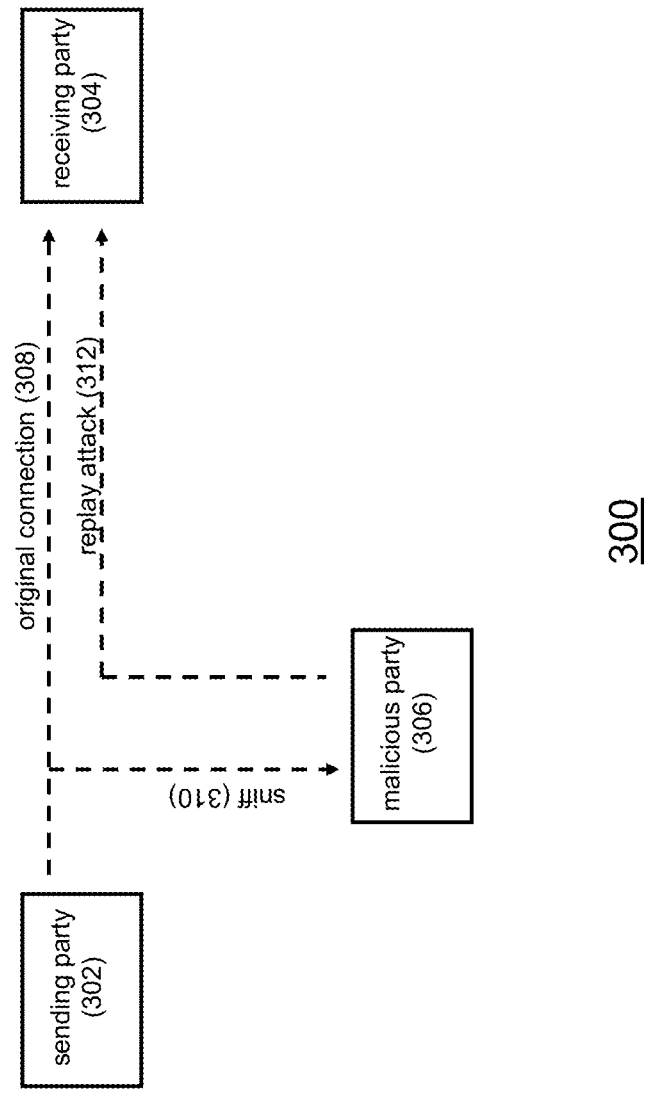
FIG. 3 is a simplified block diagram illustrating a replay attack, in accordance with some embodiments.

A replay attack occurs when a malicious user captures network traffic between two entities, a sending party and a receiving party. The malicious user then resends the captured network traffic to the receiving party, pretending to be the sending party. FIG. 3 is a simplified block diagram illustrating a replay attack 300. The sending party 302 establishes an original connection 308 with a receiving party 304, and sends contents (such as an email or data) over the connection. The malicious party 306 sniffs 310 the contents of the original connection 308. The malicious party 306 then resends the contents to the receiving party 304, as a replay 312, where the malicious party is pretending to be the sending party 302.

Replay attacks can be solved by using timestamps and sequence numbers. If the receiving party 304 has an authentication system, only network packets that contain the appropriate timestamp or sequence number will be accepted. Packets with timestamps beyond a certain time will be discarded.

Problem

As described in the Background section, the blockchain network uses a consensus algorithm to reach an agreement on the global state of the blockchain and also to elect the leader node which can publish blocks to extend the current chain of blocks. Every node in the blockchain network will maintain a copy of the global state or ledger state, the list of blocks, and validate all the transactions in the blocks.

The process of validating transactions in the blockchain involves executing the transaction according to the appropriate business logic and storing the resultant (new or updated) data in the state. Thus, whenever a new node joins the network or an existing node rejoins the network, the node has to synchronize the blockchain state with the other nodes in the network by executing each and every transaction from the start to the end, the state matches every other node's state. Until the state is synchronized, the node will not be able to participate in blockchain consensus and successfully publish new blocks to the blockchain. Three possible solutions and their drawbacks are described.

The first solution is to download the entire blockchain from a peer node of the P2P network and validate all the transactions in these blocks to restore the global state. This could be a time-consuming operation and can take hours to build the blockchain, depending on its size. As the blockchain continues to grow in size, the ability of a node to join the P2P network will become more constrained using the first solution.

The global (ledger) state of the blockchain may be stored in many different formats. Hash trees, for example, allow efficient and secure verification of the contents of large data structures, where a Merkle tree is one type of hash tree. Thus, for both efficiency and security, the blockchain ledger may be stored in the secure memory of a node's TEE as a Merkle tree.

Therefore, where a Merkle tree is used, a second possible solution to enable a P2P node to recover from a temporary network disruption is to downloading only missing blocks and a subset of the Merkle tree from a peer node of the P2P network. For a node entering the blockchain for the first time, a synchronization mechanism may allow the node to download a subset of blocks and Merkle tree up to the last known synchronization block and state. This solution is designed to speed up synchronization of the blocks and the global state with peer nodes in the network. Since the logic is executed and the blockchain state is maintained in untrusted memory, the second solution is at risk of software security attacks, such as the replay attack illustrated in FIG. 3.

The first solution, in which the entire blockchain is downloaded, is slower than the second solution, and both have issues in which code is executed in untrusted memory. If security of the nodes is not breached in a majority or two-thirds of the nodes (or whatever defines a majority, based on the consensus mechanism), the first solution actually has a better security profile than the second solution, due to the larger number of blocks being downloaded.

A third possible solution is to use the TEE to run some part of the blockchain logic, for example, the consensus algorithm or block validation logic, following a network disruption of the node. In this scenario, the portion of blockchain logic is maintained in the secure TEE memory. Nevertheless, as with the first and second solutions, the TEE has to be restarted from untrusted code, as illustrated in FIG. 2. Therefore, untrusted code is used to initialize the TEE context by accepting the input parameters related to the blockchain state from untrusted code. If a node tries to build the blockchain after it goes down temporarily, it has to restart the TEE and restore the TEE context based on the parameters passed from the untrusted part, which is unreliable. Thus, every time the TEE is to be restarted, the node relies on peer TEEs to restore the TEE context, and doing so securely is challenging.

The third solution is more problematic for platforms which do not have hardware monotonic counters and realtime clock (RTC). Recall from FIG. 3 that replay attacks can be avoided with counters and timestamps. Thus, hardware such as monotonic counters and RTC could prevent against replay attacks. Intel SGX on Server Platforms without Platform Services is one example of a node that lacks such hardware. TEEs implemented on such nodes are unable to rely on secure state restoration due to the risk of replay attacks.

Further, maintaining the entire blockchain state and logic inside the TEE may not be feasible. TEEs generally have memory limitations in platforms which support the TEE, whereas blockchain size can grow continuously.

Thus, none of the above existing solutions can be relied upon to restore the blockchain state quickly and securely without validating entire blocks and building the global state starting from genesis block. Solution#1 is slow, solution #2 is subject to security attack and is unreliable. Solution #3 is also unreliable to restore the global state securely as the TEE accepts inputs from an untrusted part of the node. In each proposed solution, the node obtains the blockchain state from peer nodes, while in the third proposed solution, whenever its TEE is restarted, the node additionally restores its TEE context from context information maintained in other TEEs.

Bootstrap Method

Figure 4:
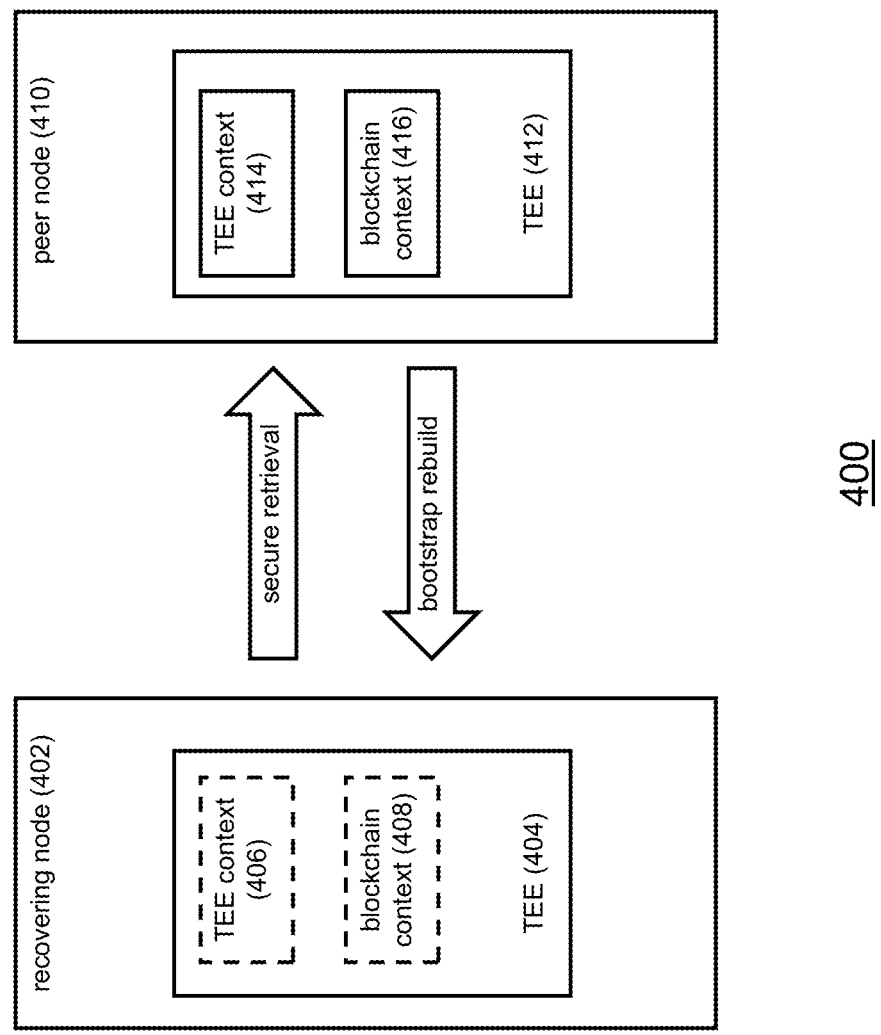
FIG. 4 is a simplified block diagram of a method to enable a node to securely bootstrap a blockchain from one or more peer nodes, in accordance with some embodiments.

FIG. 4 is a simplified block diagram of a method 400 to enable a node to securely bootstrap a blockchain from one or more peer nodes of the P2P network, according to some embodiments. The blockchain bootstrap method 400 is a fast and secure protocol to bootstrap the blockchain by restoring its state using both the TEE of the node and the TEE of the one or more peer nodes. For simplicity, a single peer node is depicted in FIG. 4.

The term "bootstrap" refers to a technique of loading a program using a few initial instructions, which enable the introduction of the rest of the program from an input device. As described and illustrated below, using secure retrieval, the blockchain bootstrap method 400 enables a portion of the blockchain from a peer node so that the TEE context of the recovering node can be quickly and securely realized so that the recovering node can again participate in blockchain consensus. Alternatively, the recovering node can use the blockchain bootstrap method 400 to copy over the entire blockchain and state from a peer node without having to process each block from scratch, thereby significantly improving its performance during the bootstrap phase, in some embodiments.

In the blockchain bootstrap method 400, the node 402 is recovering from a network or power disruption, or is a new node joining the P2P network of the blockchain. The node 402 is to bootstrap its TEE 404 using information from the TEE 412 of a peer node 410 in the P2P network. More particularly, the node 402 is going to restore its TEE context 406 by retrieving a TEE context 414 from the peer node 410. Similarly, the node 402 restores its blockchain context 408 by retrieving a blockchain context 416 from a peer node. What portion of the blockchain context is restored is implementation-specific. Further, in some embodiments, the recovering node 402 retrieves the TEE context and blockchain context from several nodes of the P2P network and makes a decision about which node's contexts to download.

A context is a set of parameters or resources, such as device memory, command queues, and registers, that are cryptographically bound to a public/private key pair and isolated from untrusted software on the host, including the driver and all other contexts. When the node 402 rejoins the blockchain P2P network, its TEE context 406 is lost and thus needs to be restored before participation in the blockchain can resume. Thus, in some embodiments, the node 402 relies on the TEE context 414 maintained in peer TEE nodes to securely initialize its own TEE context 406.

Similarly, in some embodiments, the node 402 relies on the blockchain context 416 maintained in peer TEE nodes to securely initialize its own blockchain context 408. The node 402 is then able to securely and quickly synchronize the blockchain state with other nodes by establishing a secure channel between the peer TEEs. This is available to the node whether newly joining the P2P network or rejoining the network after going down temporarily.

In some embodiments, any product which uses a TEE may quickly restore the blockchain state of a large blockchain after restarting the node or joining an existing network. The node can quickly synchronize blockchain state can also immediately start participating in the consensus mechanism to publish valid blocks to the blockchain, in some embodiments.

In the blockchain bootstrap method 400, the TEE context 406 will be restored by securely retrieving the input parameters (TEE context 414 and blockchain context 416) directly from peer TEEs. Using the protocol described below, a TEE running in a node will establish a secure communication channel between peer TEEs. Once the blockchain context is securely retrieved, the node 402 will be able to do a bootstrap rebuild of its own TEE context 406, enabling the node to return to blockchain operations.

Figure 5A:
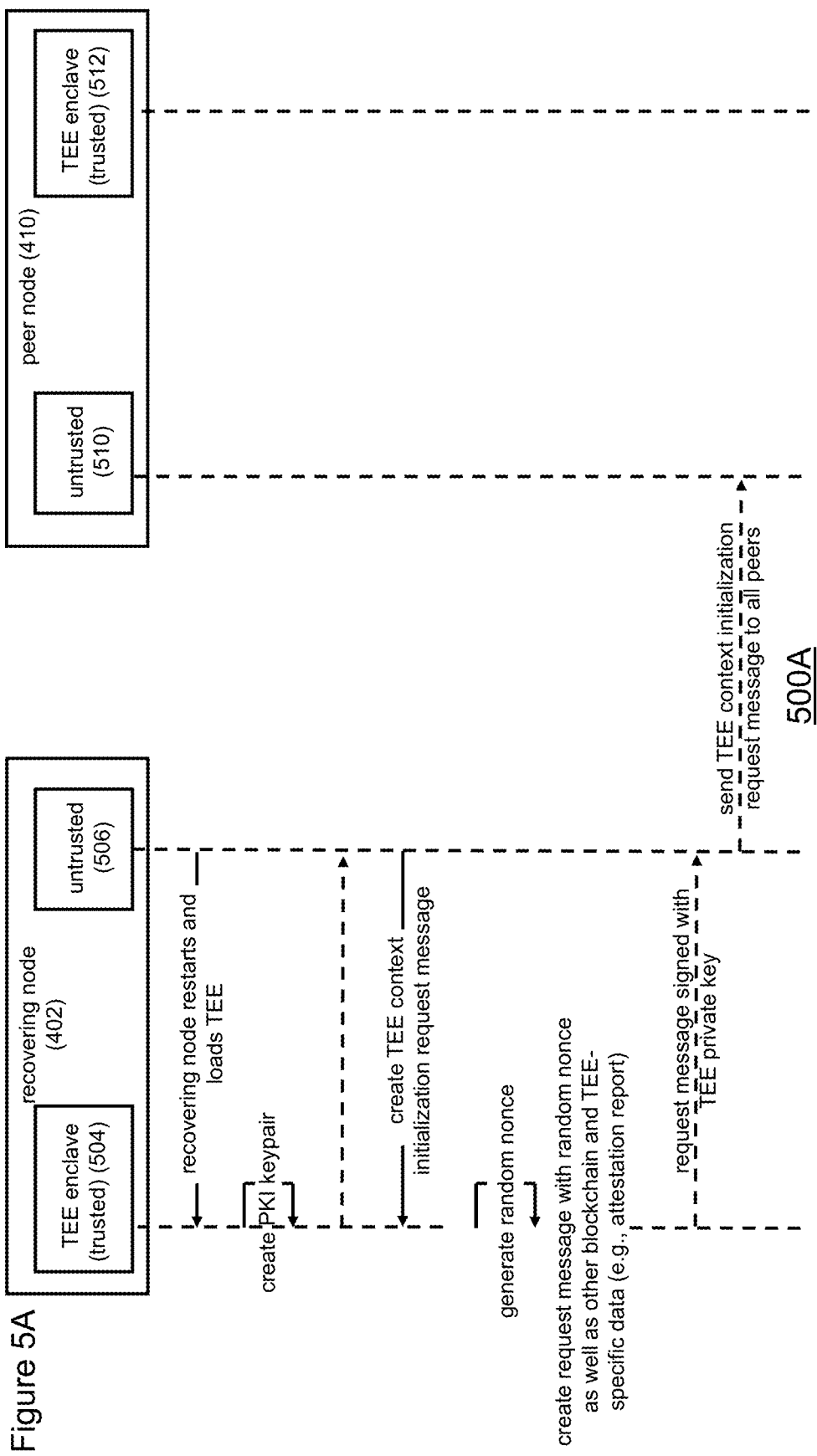
FIGS. 5A-5C illustrate the high-level steps of the method of FIG. 4, in accordance with some embodiments.
Figure 5B:
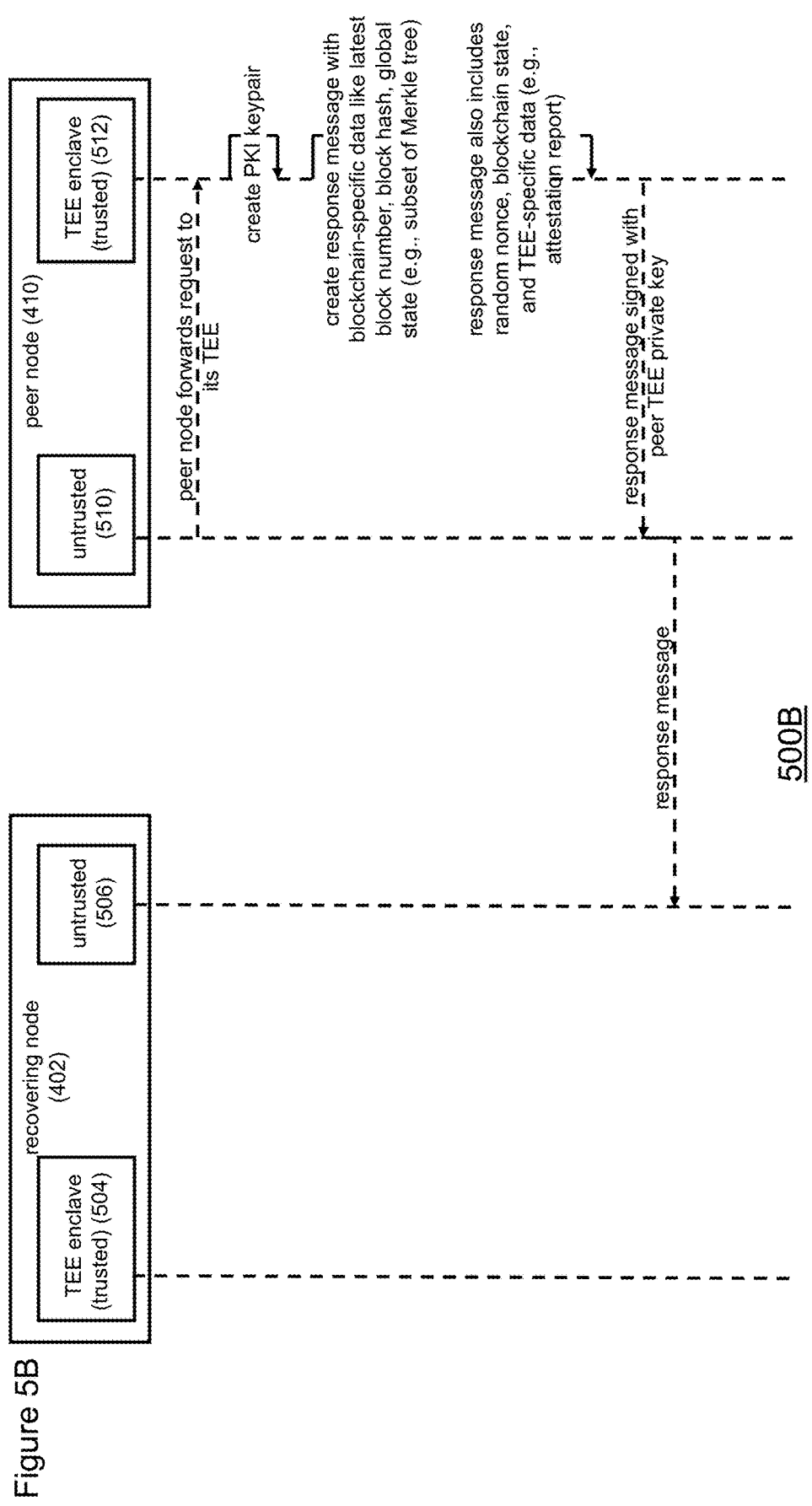
Figure 5C:
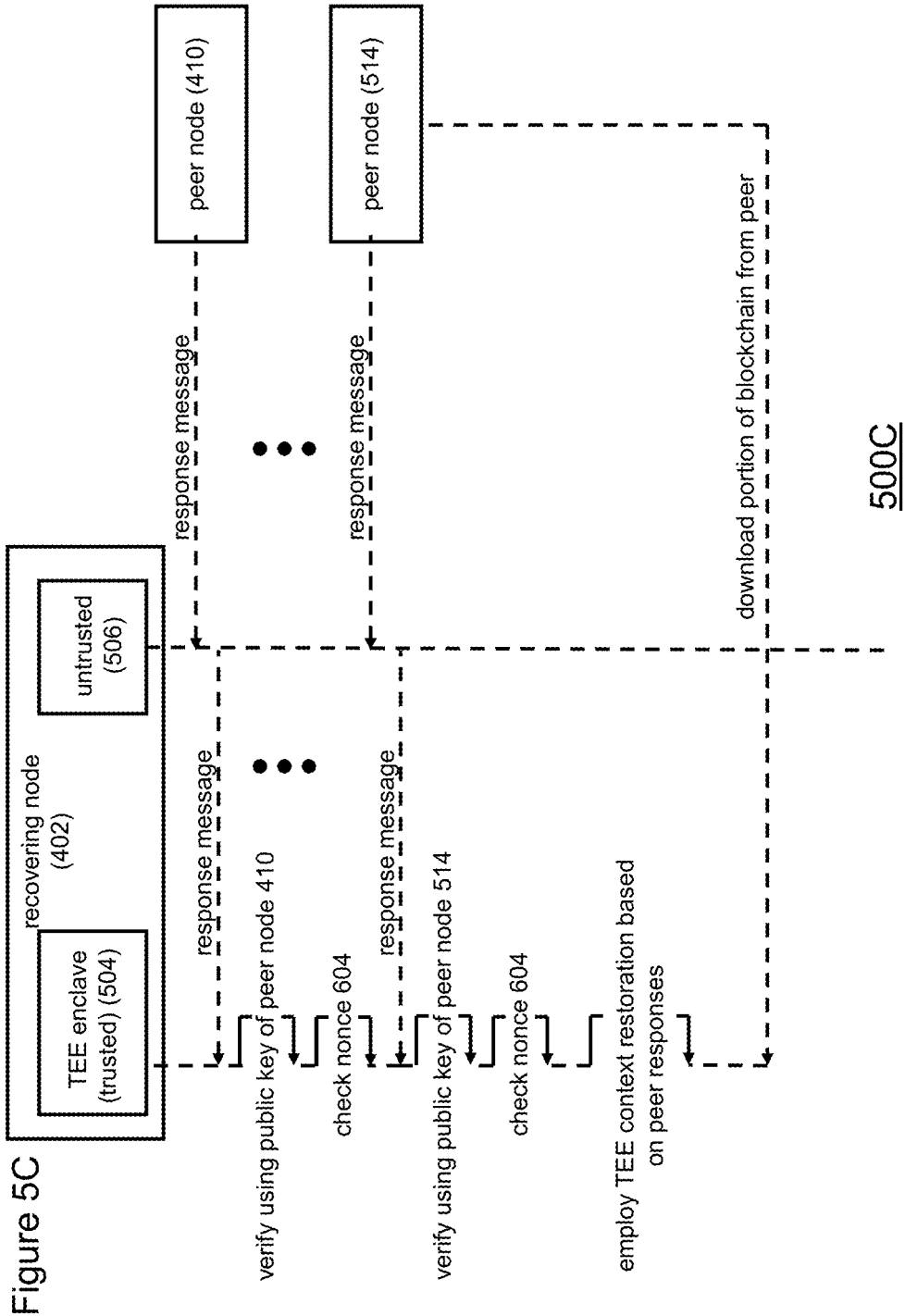

FIGS. 5A-5C illustrate the high-level steps 500A, 500B, and 500C, respectively, of the blockchain bootstrap method 400, according to some embodiments. A node being restarted after network, power disruption, or first entering the P2P network, is known as the recovering node 402, and the node from which recovery is obtained is the peer node 410. As in FIG. 4, a single peer node is illustrated, although the recovery operations may involve multiple peers of the P2P network. The recovering node 402 includes a trusted portion, the TEE or enclave 504, and an untrusted portion 506. Similarly, the peer node 410 includes an untrusted portion 510 and a trusted TEE 512.

Recall from FIG. 2 that the TEE enclave is launched or loaded from the untrusted part of the node. Thus, in operations 500A (FIG. 5A), the untrusted portion 506 of the recovering node 402, after restarting, loads the TEE enclave 504 and asks the enclave to create the PKI keypair and create the context initialization message, both of which are done inside the TEE enclave. The TEE enclave 504 generates a public key infrastructure (PKI) key pair inside its trusted memory and returns. Next, the TEE enclave 504 will create a TEE context initialization request message. The TEE enclave then generates a random nonce within its trusted memory. In some embodiments, the request message will contain the random nonce.

A random nonce or cryptographic nonce is an arbitrary number, usually a random or pseudo-random number, that is designed to be used once. To ensure this, the nonce is either time-stamped (which works if both parties to the nonce are synchronized) or it has enough random bits that it is probabilistically unlikely to be repeated. The nonce is generated to avoid replay attacks, as illustrated in FIG. 3.

As described above, TEE enclaves support remote attestation. Remote attestation allows a remote entity to establish trust in the enclave. The TEE of the recovering node 402 needs to be able to trust the TEE of the peer node 410. Likewise, the TEE of the peer node needs to be able to trust the TEE of the recovering node. Otherwise, communication between them is not trustworthy.

Under remote attestation, code hosted in the TEE enclave of the recovering node 402 can request a quote, which contains different enclave attributes, including a measurement of the enclave's initial state. The quote is signed by a processor-specific attestation key. A remote challenger, in this case, the peer node 410, can use an attestation verification service, such as Intel's IAS, to confirm that the quote has been signed by a valid attestation key. The peer node can also verify that the enclave has been initialized in an expected state. Once the recovering node enclave 504 has been verified, the peer node 410 can set up a secure channel with the enclave (using a secure key exchange protocol) and provision secrets, such as encrypted code or data encryption keys, to the enclave. Thus, the peer node verifies if the request for context initialization is coming from a valid enclave. In the case of Intel SGX enclave, the peer node uses an IAS report to verify the enclave.

Remote attestation is one way in which enclaves or TEEs can verify one another. Another way they could verify each other is by having a Certificate Authority issue a certificate to each TEE. The other TEE could then simply verify the certificate.

Figure 6:
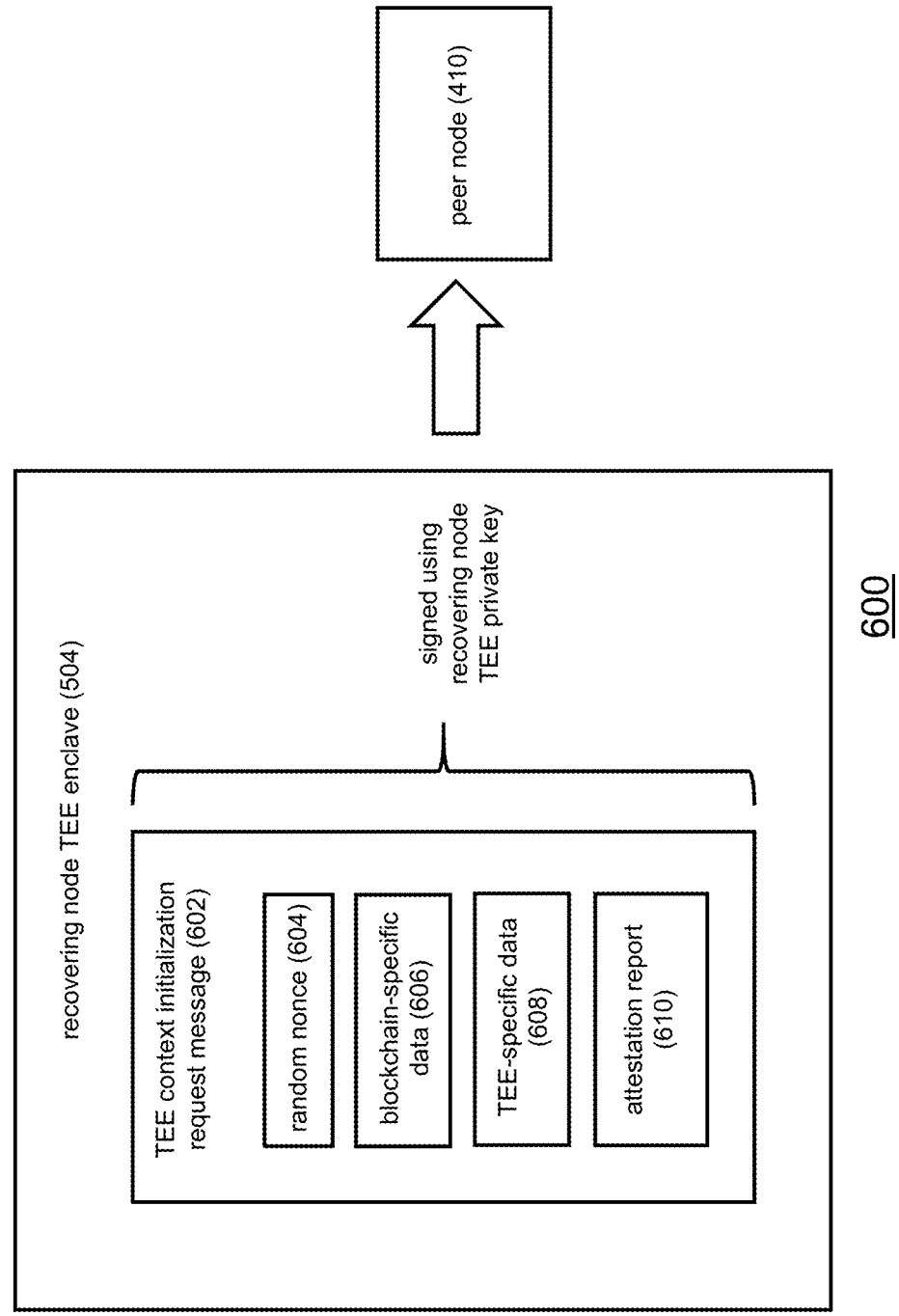
FIG. 6 illustrates the contents of the TEE context initialization request message used by the method of FIG. 4, in accordance with some embodiments.

FIG. 6 illustrates the environment 600 of the TEE context initialization request message, according to some embodiments. The TEE context initialization request message 602, generated inside the TEE enclave 504 of the recovering node 402, contains the random nonce 604, to avoid replay attacks. Additionally, in some embodiments, the request message will contain other blockchain-specific data 606 as well as TEE-specific data 608. The TEE context initialization request message 602 will also contain some type of attestation report 610. Where the TEE is an Intel SGX-based TEE, the attestation report is known as an AVR (Attestation Verification Report) from Intel Attestation Service (IAS).

Under Intel's SGX, the AVR is received by the peer node in response to a quote that measures the enclave of the recovering node 402 and assures the IAS that it is communicating with a trusted and whitelisted enclave. The AVR has the recovering node TEE's public key in the report body. Where a non-Intel TEE is used, a different mechanism may be employed. Nevertheless, in some embodiments, the TEE context initialization request message will have some type of TEE-specific information. In some embodiments, before being transmitted to the peer node 410, the TEE context initialization request message 602 is signed using the recovering node's TEE private key.

In FIG. 6, the attestation report is inside the TEE context initialization request message signed by the private key. In some embodiments, a public key used to sign the context initialization request message is also sent, enabling the remote peer nodes to verify the message. For Intel's SGX, the AVR is verified using the public key of IAS. In other embodiments, the AVR is kept outside the portion of the TEE context initialization request message that is signed by the private key. Then, after verifying the AVR, using the IAS public key, the public key of a peer node is extracting from report data of the Quote structure, which is user-specific data in the quote containing the public key). Other implementations are possible, depending on the type of TEE used.

Returning to the operations of 500A (FIG. 5A), the TEE context initialization request message is sent from the trusted TEE enclave 504 to the untrusted portion 506 of the recovering node 402. The TEE context initialization request message is then sent from the recovering node 402 to one or more peer nodes of the blockchain P2P network.

Moving on to FIG. 5B, the operations 500B of the peer node 410 are illustrated, according to some embodiments. For simplicity, a single peer node is illustrated, although the TEE context initialization requestion message may be sent to multiple peer nodes. First, untrusted portion 510 of the peer node 410 forwards the TEE context initialization request message to its TEE enclave portion 512. There, the peer node 410 verifies the attestation report 610 (AVR in the case of Intel's SGX) to assure that the request message has been generated for a valid TEE, that is, the TEE enclave 504 of the recovering node 402. The verification and attestation operations are not described in detail here, but will be described from the perspective of the recovering node below. Similar operations are to be performed by all TEEs receiving data from other entities, as the trust of the entity is not initially known.

Figure 7A:
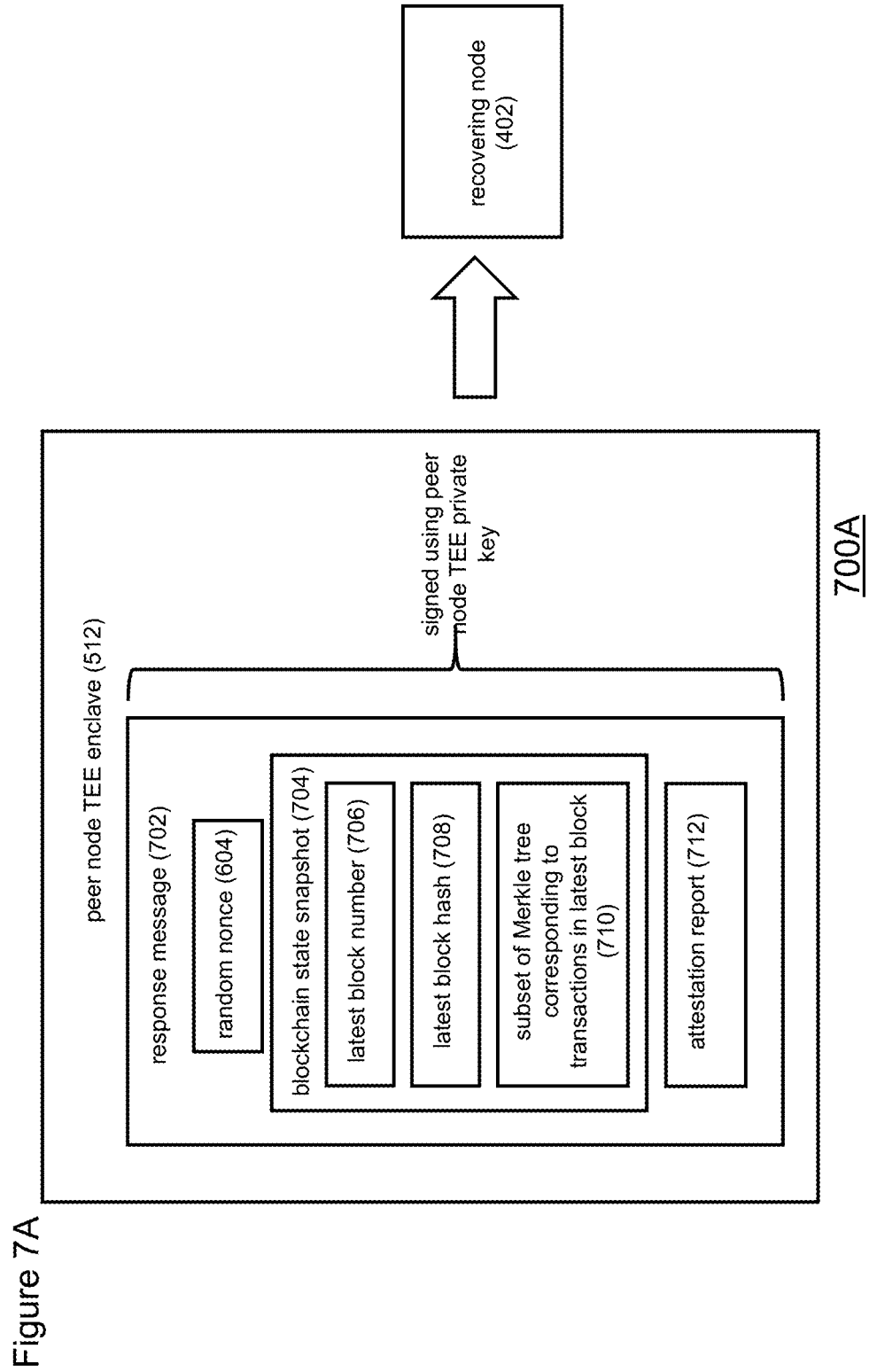
FIGS. 7A and 7B illustrates the contents of the response message used by the method of FIG. 4, in accordance with some embodiments.

Inside the TEE enclave portion 512, the peer node 410 generates its own PKI pair consisting of a public key and a private key. The peer node 410 next generates a response message. FIG. 7A illustrates the environment 700A of the response message to the TEE context initialization request message, according to some embodiments. The response message 702, generated inside the TEE enclave 512 of the peer node 410, contains the random nonce 604 from the request message, to avoid replay attacks, as well a snapshot of the blockchain state 704 on the peer node.

The snapshot of the blockchain state 704 may vary based on the blockchain type, the consensus mechanisms, configuration parameters, etc. In some embodiments, the blockchain state snapshot 704 contains the latest block number 706, the latest block hash 708, and a subset of a Merkle tree corresponding to the transactions in the latest block 710. Like the TEE context initialization request message 602, the response message 702 also includes an attestation report 712, in some embodiments. Where the peer node TEE enclave is an Intel SGX-based TEE, the response message includes an AVR from IAS used for remote TEE attestation, where the AVR attestation report has the public key of the peer node TEE enclave 512 in the report body. In some embodiments, the response message 702 is signed using the peer node TEE enclave private key. This is done so the recovering node 402 can trust the response message as coming from a valid SGX enclave. Similar to FIG. 6, in other implementations, the attestation report may reside outside the private key signed portion of the response message.

Figure 7B:
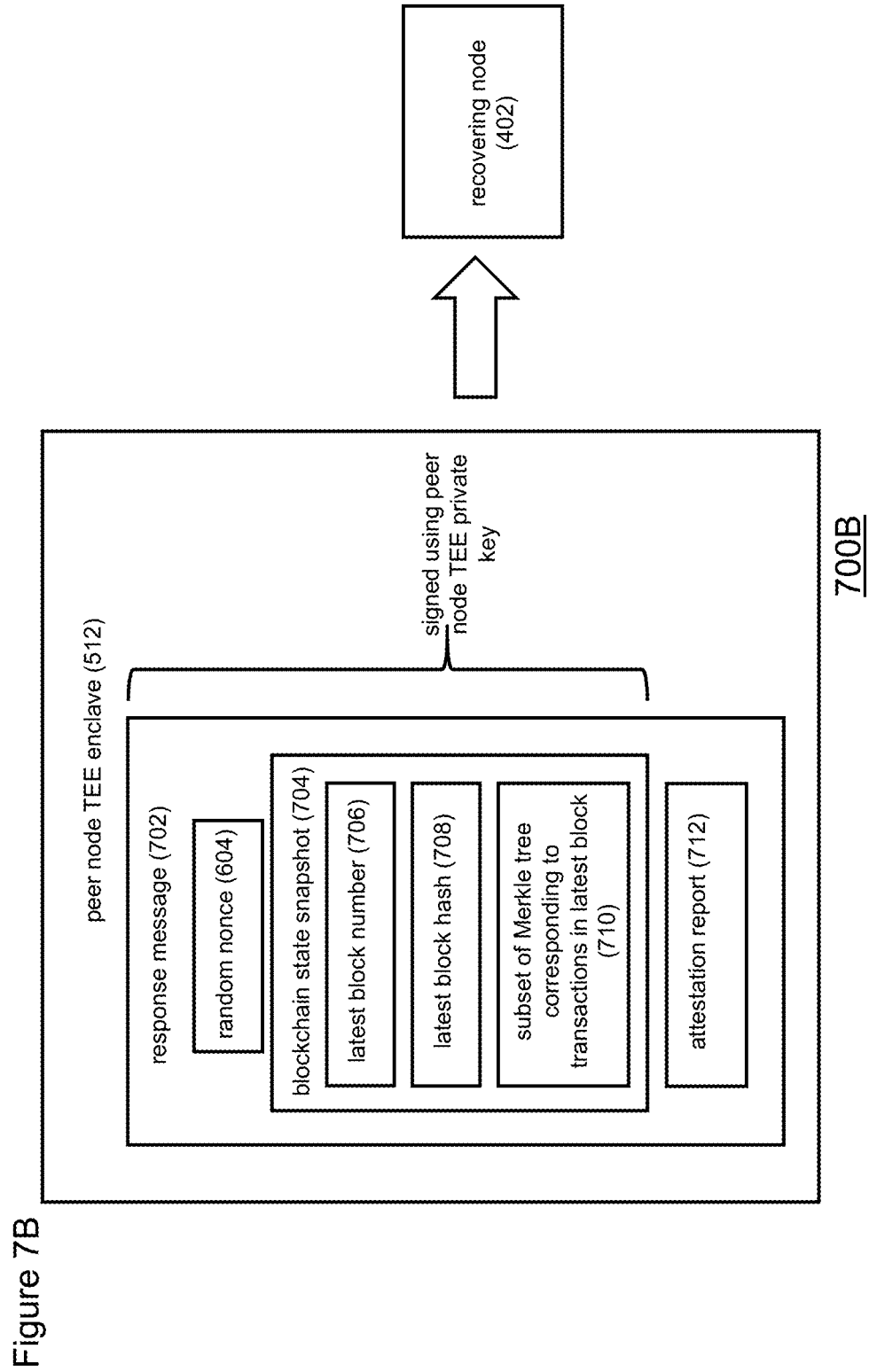

The illustration of FIG. 7A shows the attestation report 712 inside the portion signed using the peer node TEE private key. In some embodiments, the peer node public key is then separately sent to the recovering node TEE enclave. In other embodiments 700B, as illustrated in FIG. 7B, the attestation report is instead outside the portion signed by the private key, with the peer node public key then being extracted from the attestation report. In the case of Intel's IAS, the attestation report would be verified using the public key of Intel's IAS. The blockchain bootstrap method 400 is operable using either configuration 700A or 700B.

Returning to the operations 500B (FIG. 5B), once the response message has been signed with the private key of the trusted TEE enclave 512, the message is sent to the untrusted portion 510 of the peer node 410. Accordingly, the untrusted code 510 in the peer node 410 sends the response message to the recovering node 402.

In some embodiments, the recovering node 402 obtains response messages from multiple peer nodes. FIG. 5C shows operations 500C in which the recovering node 402 receives a response message from the peer node 410 featured in FIGS. 5A and 5B, plus response messages from other peer nodes 514 . . . 516. In some embodiments, the recovering node 402 will verify the response message of each peer node using the public key of the respective peer node. Where the peer node uses Intel's SGX, the public key is part of the AVR report body. Other types of attestation reports may similarly supply the public key to the recovering node. For each peer node, the recovering node 402 is ascertaining whether the response message has come from a trusted TEE. By using the public key to verify the response message signed using the peer node's private key, the response message is verified, in some embodiments.

In some embodiments, for each peer node, the recovering node 402 further checks the nonce 604 in the response message (FIGS. 7A and 7B), to ensure it is the same nonce that was embedded in the original TEE context initialization request message (FIG. 6). This ensures that the response message matches with the previous request message, thus avoiding replay attacks by nefarious snoopers who may be disposed to intercept the communication channel between the recovering node and the peer node.

Once the public key and nonce verification of each response message is complete, the recovering node 402 will restore its context by comparing the response message from multiple peer TEEs. The mechanism used for context restoration depends on the consensus mechanism used for the blockchain, in some embodiments. The recovering node TEE enclave 504 is relying on peer TEE (and blockchain) context to restore its own context rather than inputs from untrusted code. Thus, the peer TEE (and blockchain) context can be trusted.

After restoring its TEE context securely, the recovering node is now able to confidently download only a portion of the blockchain and a subset of the Merkle tree from one of its peer nodes to quickly boot strap the blockchain and start participating in consensus. Alternately, the recovering node can copy over the entire blockchain and state without trying to process each block, thereby significantly improving its performance during the bootstrap phase.

Figure 8:
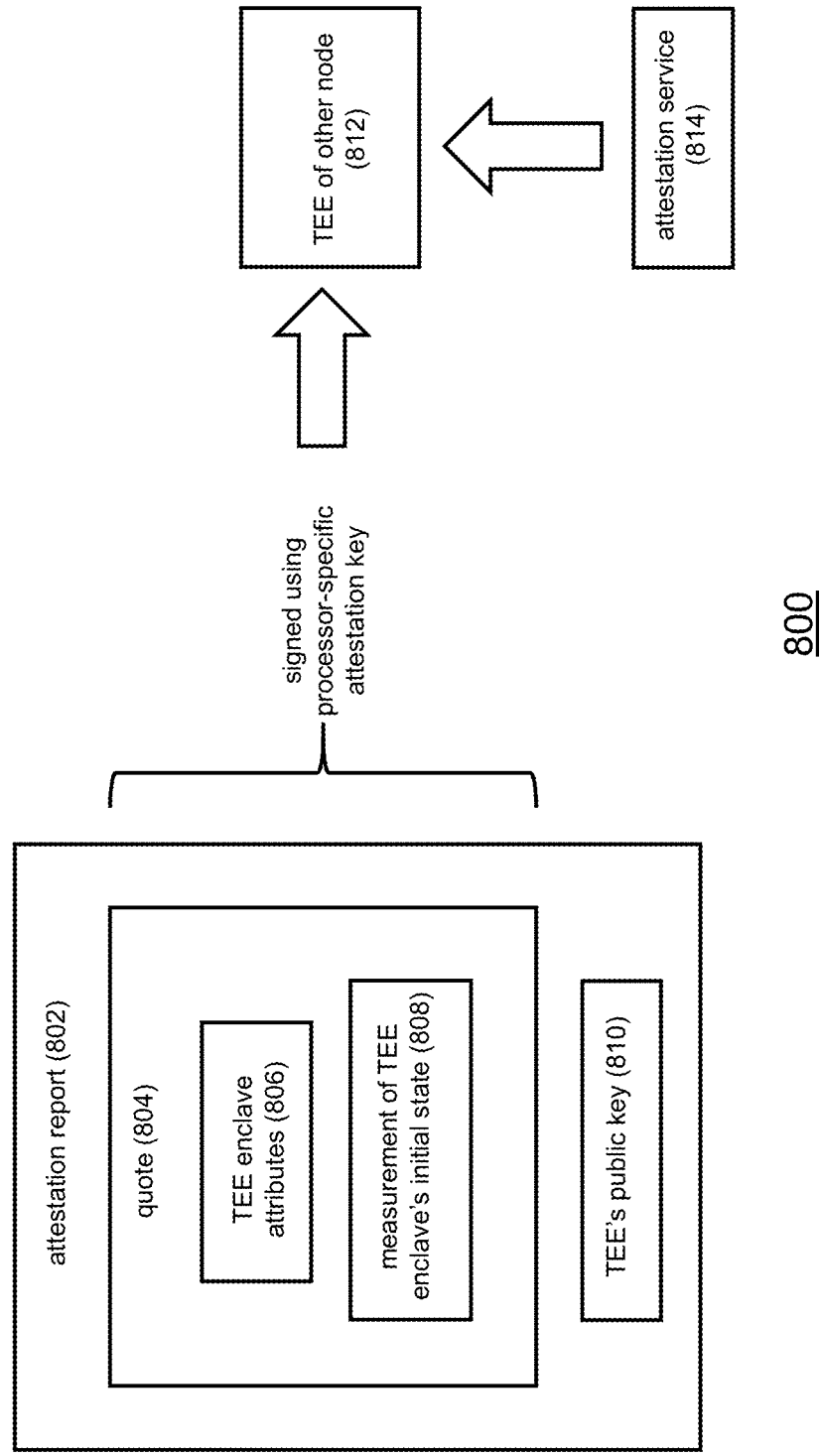
FIG. 8 is a simplified block diagram of the attestation report used by the method of FIG. 4, in accordance with some embodiments.

FIG. 8 is a simplified block diagram illustrating the attestation environment 800, used by both the recovering node and the peer node, in establishing trust in one another. As illustrated in FIG. 6, the attestation report 610 is part of the TEE context initialization request message 602 of the recovering node TEE enclave 504. In FIGS. 7s 7A and 7B, the attestation report 712 is part of the response message 702 of the peer node TEE enclave 512. Thus, the attestation report is a way for each TEE to confirm that the other TEE is trustworthy.

As shown in FIG. 8, the attestation report 802 includes a quote 804 and the public key 810 of the TEE in which the attestation report is being generated. Under remote attestation, code hosted in the TEE enclave of the node can request the quote 804. The quote 804 contains different TEE enclave attributes 806 as well as a measurement of the TEE enclave's initial state 808. The quote 804 is signed by a processor-specific attestation key of the TEE enclave. The attestation report 802 is then sent to the TEE enclave of the other node 812.

The other node 812 can then use an attestation service 814 (e.g., a remote server) to confirm that the quote has been signed by a valid attestation key. In the case of Intel's SGX TEE, the attestation service is called Intel Attestation Service or IAS. The other node can also verify that the enclave has been initialized in an expected state. Once the original node enclave has been verified, the other node can set up a secure channel with the enclave (using a secure key exchange protocol) and provision secrets, such as encrypted code or data encryption keys, to the enclave. In the example of FIGS. 5A-5C, once this step is completed, the recovering node is able to download the portion of the blockchain from the peer node, enabling the recovering node to bootstrap its initialization so the recovering node can again publish blocks to the blockchain. Although FIGS. 6-8 illustrate particular implementations, TEE-specific implementations may vary and what is used to restore in the blockchain is also specific to the blockchain implementation, in some embodiments.

Figure 9:
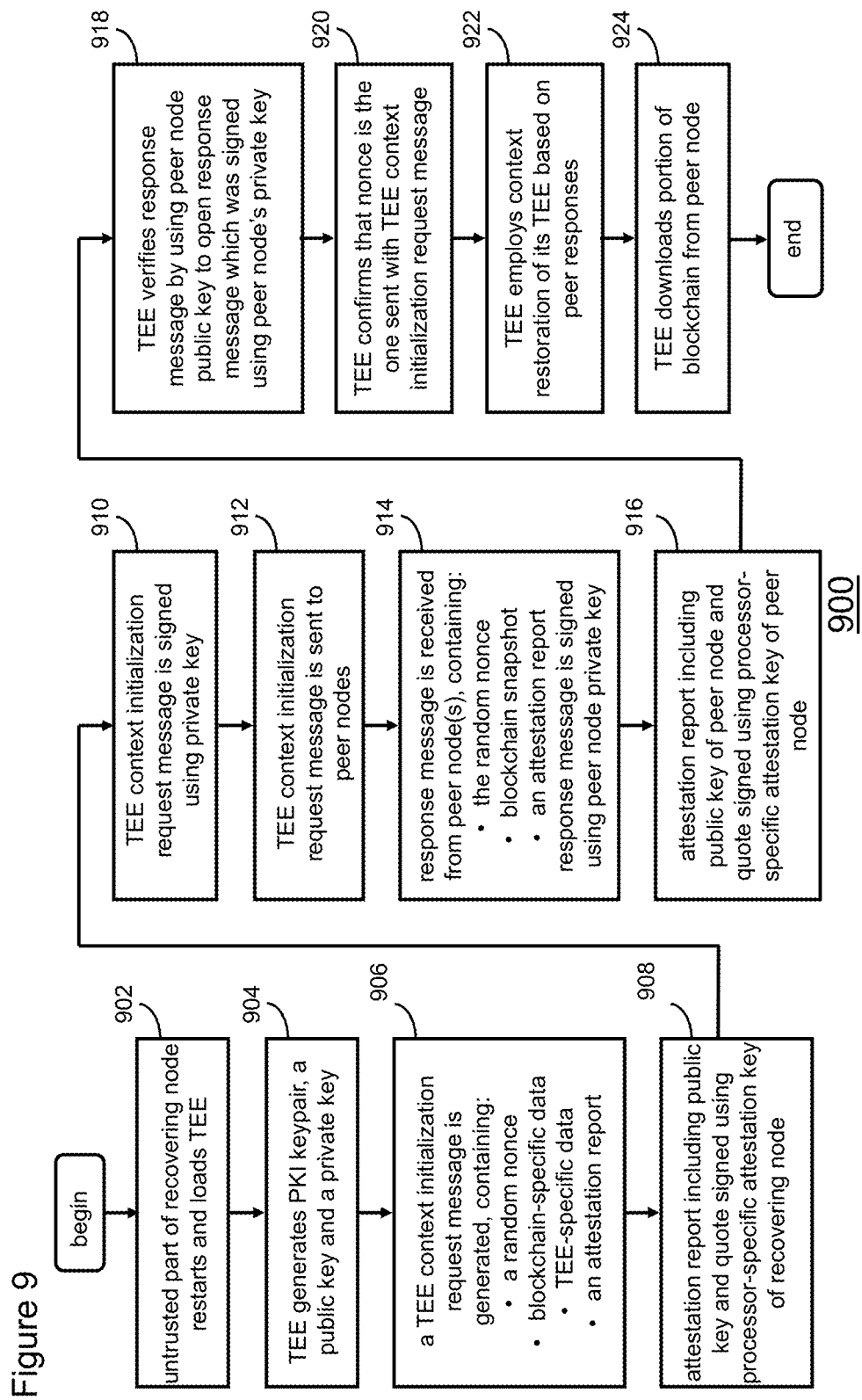
FIG. 9 is a flow diagram illustrating the operations of the method of FIG. 4 from the perspective of the recovering node, in accordance with some embodiments.
Figure 10:
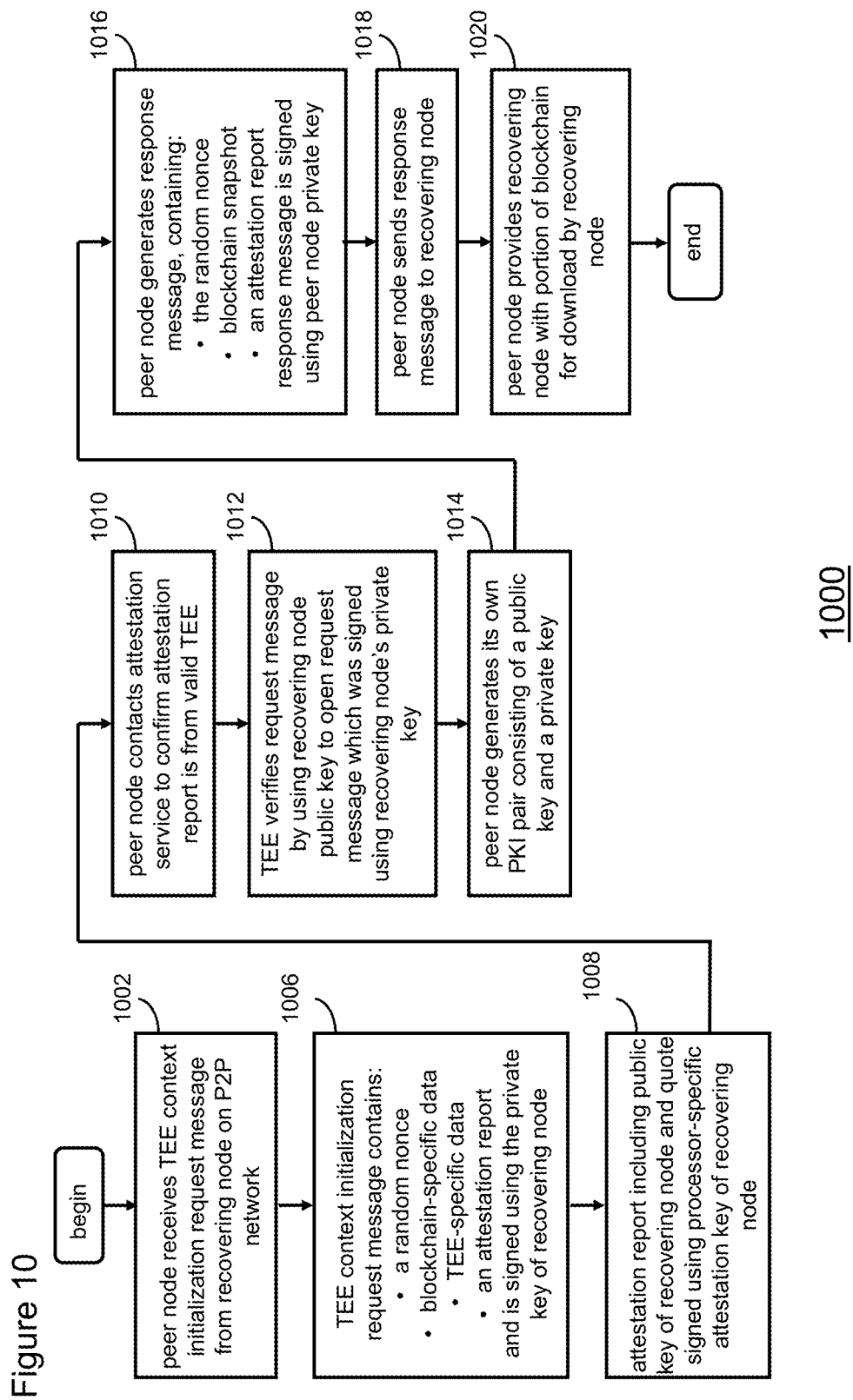
FIG. 10 is a flow diagram illustrating the operations of the method of FIG. 4 from the perspective of one of the peer nodes, in accordance with some embodiments.

FIGS. 9 and 10 are flow diagrams illustrating the above operations from the perspective of the recovering node and the peer node, respectively, according to some embodiments. Starting with the operations 900 of FIG. 9, the untrusted part of the recovering node restarts and loads the TEE (block 902). The recovering node TEE then generates a PKI pair consisting of a public key and a private key (block 904). The recovering node TEE also generates a TEE context initialization message, the contents of which are illustrated in FIG. 6, namely, a random nonce, blockchain-specific data, TEE-specific data, and an attestation report, which would be the AVR in the case of SGX (block 906). The attestation report, as illustrated in FIG. 8, contains the public key and a quote which is signed using a processor-specific attestation key of the recovering node (block 908). The TEE context initialization request message is also signed using the private key of the recovering node TEE (block 910). After being sent to the untrusted part of the recovering node (FIG. 5A), the TEE context initialization request message is sent to peer nodes of the blockchain P2P network (block 912). The TEE context initialization request message will be processed by the peer nodes as described above and also in conjunction with the flow diagram of FIG. 10.

If all goes well on the peer side, the recovering node can expect to receive a response message from one or more of the peer nodes (block 914). As illustrated in more detail in FIGS. 7A and 7B, the response message coming from the peer node contains the random nonce that was sent by the recovering node in its request message, as well as a blockchain snapshot and an attestation report. The response message is signed using the private key of the peer node (block 914). The attestation report, as illustrated in detail in FIG. 8, includes the public key of the peer node as well as a quote signed by a processor-specific attestation key of the peer node (block 916).

At this point, the recovering node TEE wants to make certain the response message is from a legitimate TEE. Thus, the recovering node TEE verifies the response message using the peer node public key (either extracted from the attestation report or separately received) to open the response message, as the response message was signed using the peer node private key (block 918). The TEE also confirms that the nonce embedded in the response message is the one the recovering node sent with the request message (block 920).

In some embodiments, the recovering node performs the steps 918 and 920 for each of several peer nodes. The recovering node TEE then employs context restoration of itself based on the peer responses (block 922). Finally, the TEE is able to download the portion of the blockchain from one of the peer nodes and have confidence that 1) the downloaded portion of the blockchain came from a trusted TEE and 2) the downloaded portion of the blockchain has not been tampered with (block 924).

FIG. 10 illustrates the above-described operations 1000 from the perspective of one of (possibly several) peer node of the P2P blockchain network. The peer node first receives the TEE context initialization request message from the recovering node (block 1002). As illustrated in FIG. 6 and describe above, the TEE context initialization request message contains the random nonce generated by the recovering node, as well as blockchain-specific data, TEE-specific data, and an attestation report, all of which are signed using the private key of the recovering node (block 1006). The attestation report includes the public key of the recovering node and a quote signed by a processor-specific attestation key of the recovering node (block 1008). The peer node contacts an attestation service, such as a remote server, to confirm that the attestation report is from a trustworthy TEE (block 1010). The peer node TEE verifies the TEE context initialization request message using the public key (either extracted from the attestation report or separately sent) (block 1012).

To generate a response message, the peer node generates its own PKI pair consisting of a public key and a private key (block 1014). The peer node TEE then generates the response message, the contents of which are described above and illustrated in FIGS. 7A and 7B (block 1016). The peer node sends the response message to the recovering node (block 1018. After the recovering node has decided the peer node is trustworthy, the peer node provides the recovering node with the portion of the blockchain (block 1020), enabling the recovering node to perform the bootstrap operation to quickly become part of the blockchain P2P network.

Figure 11:
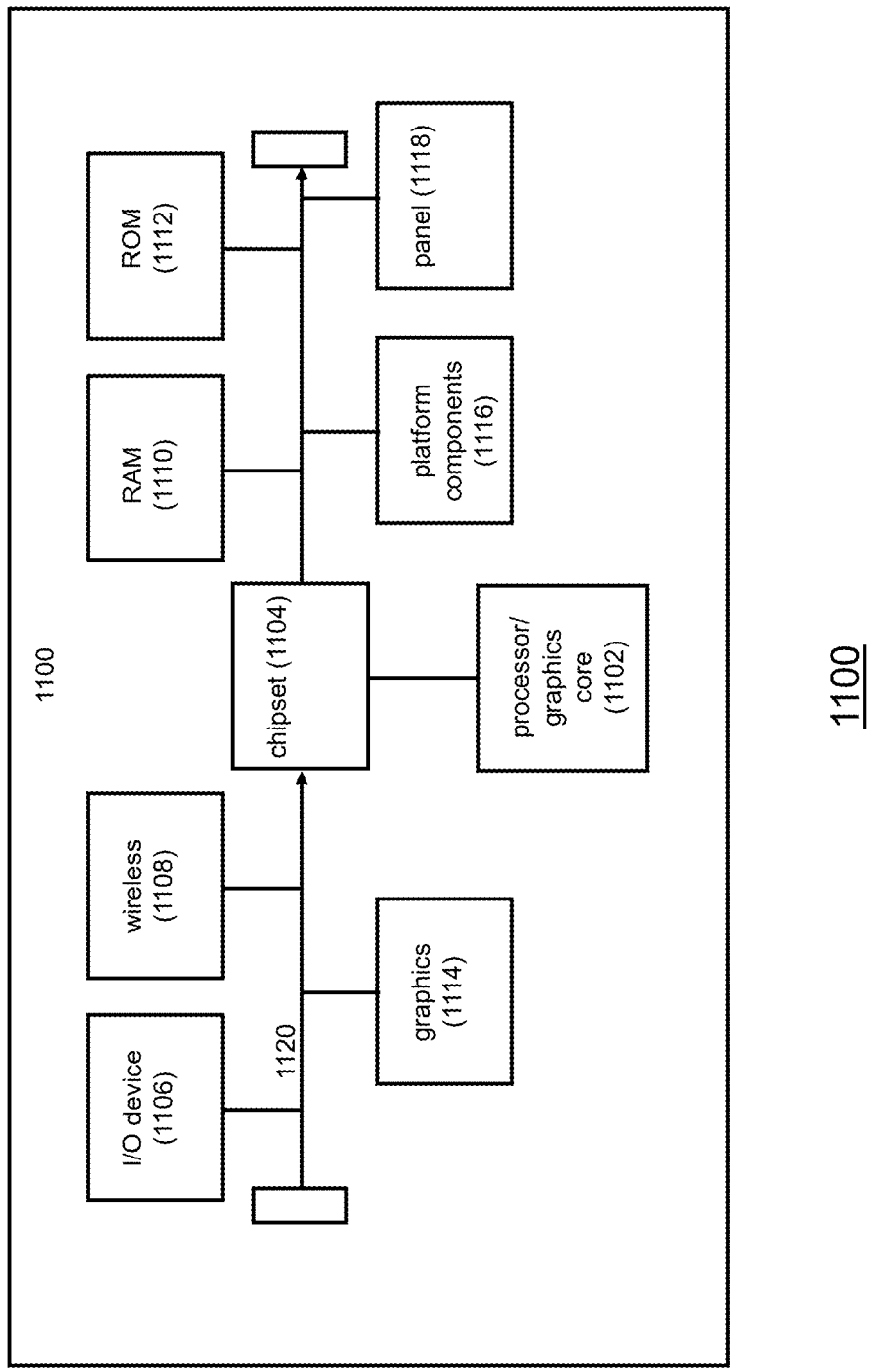
FIG. 11 is a diagram of an exemplary system embodiment in which the blockchain bootstrap method of FIG. 4 may be implemented, in accordance with some embodiments.

FIG. 11 is a diagram of an exemplary system embodiment in which the blockchain bootstrap method 400 may be implemented. A platform 1100 may include various elements. For instance, this figure depicts that platform (system) 1100 may include a processor/graphics core 1102 and a chipset 1104, which may support the TEE environment describe herein. The platform 1100 may further include an input/output (I/O) device 1106, a random-access memory (RAM) (such as dynamic RAM (DRAM)) 1110, and a read only memory (ROM) 1112, a panel 1118 and various other platform components 1116 (e.g., a fan, a cross flow blower, a heat sink, cooling system, housing, vents, and so forth). System 1100 may also include wireless communications chip 1108 and graphics device 1114. The embodiments, however, are not limited to these elements.

As depicted, I/O device 1106, RAM 1110, and ROM 1112 are coupled to processor 1102 by way of chipset 1104. Chipset 1104 may be coupled to processor 1102 by a bus 1120. Accordingly, bus 1120 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores. The processor 1102 may support the TEE described herein.

In summary, the blockchain bootstrap method may be implemented in a first example by an apparatus to support a blockchain in a peer-to-peer (P2P) network, the apparatus comprising a trusted execution environment (TEE), comprising a processor and memory coupled to the processor, the memory comprising instructions that when executed by the processor cause the processor to generate a public key infrastructure (PKI) key pair comprising a public key and a private key upon loading the TEE, wherein the TEE is unable to publish a block to the blockchain, and generate a TEE context initialization request message comprising a random nonce and blockchain-specific data, sign the TEE context initialization request message using the private key, and transmit the TEE context initialization request message to one or more peer nodes of the P2P network, wherein the TEE performs a bootstrap operation to enable the TEE to publish a block to the blockchain based on one or more response messages received from the one or more peer nodes.

Further to the first example or any other example discussed herein, in a second example, the apparatus further comprises an untrusted portion comprising a second processor and a second memory, the second memory comprising second instructions that when executed by the second processor cause the processor to restart and load the TEE.

Further to the first example or any other example discussed herein, in a third example, the TEE memory further comprises instructions that when executed by the processor cause the processor to generate an attestation report comprising a quote signed by a processor-specific attestation key, the quote comprising attributes of the TEE, and a measurement of the TEE's initial state, and the public key.

Further to the first example or any other example discussed herein, in a fourth example, the TEE memory further comprises instructions that when executed by the processor cause the processor to receive a response message of a peer node, wherein the response message is signed by a second private key of the peer node, and verify that a value embedded in the response message is the nonce.

Further to the fourth example or any other example discussed herein, in a fifth example, the TEE memory further comprises instructions that when executed by the processor cause the processor to retrieve an attestation report from the response message, wherein the attestation report contains a second public key of the peer node, and verify the response message using the second public key.

Further to the fifth example or any other example discussed herein, in a sixth example, the TEE memory further comprises instructions that when executed by the processor cause the processor to receive additional response messages from additional peer nodes of the P2P network, wherein the TEE verifies each of the additional response messages.

Further to the sixth example or any other example discussed herein, in a seventh example, the TEE memory further comprises instructions that when executed by the processor cause the processor to employ TEE context restoration based on the response message and the additional response messages.

Further to the first example or any other example discussed herein, in an eighth example, the TEE memory further comprises instructions that when executed by the processor cause the processor to download a portion of the blockchain from the peer.

Further, the blockchain bootstrap method may be implemented in a ninth example by an apparatus to support a blockchain in a peer-to-peer (P2P) network, the apparatus comprising a trusted execution environment (TEE), comprising a processor and memory coupled to the processor, the memory comprising instructions that when executed by the processor cause the processor to receive a TEE context initialization request message from a recovering node, the TEE context initialization request message comprising a random nonce and an attestation report comprising a quote signed by a processor-specific attestation key, the quote comprising attributes of a recovering node TEE and a measurement of the recovering node TEE's initial state and a public key of the recovering node, wherein the TEE provides a response message in response to determining that the recovering node TEE is valid.

Further to the ninth example or any other example discussed herein, in a tenth example, the TEE memory further comprises instructions that when executed by the processor cause the processor to contact an attestation service to confirm that the attestation report is from a valid TEE.

Further to the tenth example or any other example discussed herein, in an eleventh example, the TEE memory further comprises instructions that when executed by the processor cause the processor to open the TEE context initialization request message using the public key of the recovering node.

Further to the eleventh example or any other example discussed herein, in a twelfth example, the TEE memory further comprises instructions that when executed by the processor cause the processor to generate a public key infrastructure (PKI) key pair comprising a public key and a private key and generate a response message containing the random nonce, a blockchain snapshot, and a peer attestation report, wherein the response message is signed using the private key.

Further to the twelfth example or any other example discussed herein, in a thirteenth example, the peer attestation report comprises a peer quote comprising attributes of the peer node TEE, a measurement of the peer node TEE's initial state, wherein the peer quote is signed by a processor-specific peer attestation key of the peer node.

Further to the thirteenth example or any other example discussed herein, in a fourteenth example, the TEE memory further comprises instructions that when executed by the processor cause the processor to send a portion of the blockchain to the recovering node in response to determining that the recovering node TEE is valid.

The blockchain bootstrap method may be implemented in a fifteenth example by at least one non-transitory machine-readable storage medium comprising instructions that, when executed by a processor, cause the processor to generate a public key infrastructure (PKI) key pair comprising a public key and a private key upon loading the TEE, wherein the TEE is unable to publish a block to the blockchain, generate a TEE context initialization request message comprising a random nonce and blockchain-specific data, sign the TEE context initialization request message using the private key, and transmit the TEE context initialization request message to one or more peer nodes of the P2P network, wherein the TEE performs a bootstrap operation to enable the TEE to publish a block to the blockchain based on one or more response messages received from the one or more peer nodes.

Further to the fifteenth example or any other example discussed herein, in a sixteenth example, the at least one non-transitory machine-readable storage medium comprises instructions that further cause the processor to generate an attestation report comprising a quote signed by a processor-specific attestation key, the quote comprising attributes of the TEE and a measurement of the TEE's initial state, and the public key.

Further to the fifteenth example or any other example discussed herein, in a seventeenth example, the at least one non-transitory machine-readable storage medium comprises instructions that further cause the processor to receive a response message of a peer node, wherein the response message is signed by a second private key of the peer node and verify that a value embedded in the response message is the nonce.

Further to the seventeenth example or any other example discussed herein, in an eighteenth example, the at least one non-transitory machine-readable storage medium comprises instructions that further cause the processor to retrieve an attestation report from the response message, wherein the attestation report contains a second public key of the peer node and verify the response message using the second public key.

Further to the eighteenth example or any other example discussed herein, in a nineteenth example, the at least one non-transitory machine-readable storage medium comprises instructions that further cause the processor to receive additional response messages from additional peer nodes of the P2P network, wherein the TEE verifies each of the additional response messages.

Further to the nineteenth example or any other example discussed herein, in a twentieth example, the at least one non-transitory machine-readable storage medium comprises instructions that further cause the processor to employ TEE context restoration based on the response message and the additional response messages and download a portion of the blockchain from the peer.

The blockchain bootstrap method may be implemented in a twenty-first example by a method to support a blockchain in a peer-to-peer (P2P) network comprising a processor and a memory storing instructions to be executed by the processor, means for generating a public key infrastructure (PKI) key pair comprising a public key and a private key upon loading the TEE, wherein the TEE is unable to publish a block to the blockchain, means for generating a TEE context initialization request message comprising a random nonce and blockchain-specific data, means for signing the TEE context initialization request message using the private key, and means for transmitting the TEE context initialization request message to one or more peer nodes of the P2P network, wherein the TEE performs a bootstrap operation to enable the TEE to publish a block to the blockchain based on one or more response messages received from the one or more peer nodes.

Further to the twenty-first example or any other example discussed herein, in a twenty-second example, the method comprises means for generating an attestation report comprising a quote signed by a processor-specific attestation key, the quote comprising attributes of the TEE and a measurement of the TEE's initial state, and the public key.

Further to the twenty-second example or any other example discussed herein, in a twenty-third example, the method comprises means for receiving a response message of a peer node, wherein the response message is signed by a second private key of the peer node and verify that a value embedded in the response message is the nonce.

Further to the twenty-third example or any other example discussed herein, in a twenty-fourth example, the method comprises means for retrieving an attestation report from the response message, wherein the attestation report contains a second public key of the peer node and means for verifying the response message using the second public key.

Further to the twenty-fourth example or any other example discussed herein, in a twenty-fifth example, the method comprises means for receiving additional response messages from additional peer nodes of the P2P network, wherein the TEE verifies each of the additional response messages.

Further to the twenty-fifth example or any other example discussed herein, in a twenty-sixth example, the method comprises means for employing TEE context restoration based on the response message and the additional response messages and download a portion of the blockchain from the peer.

The blockchain bootstrap method may be implemented in a twenty-seventh example by machine-readable storage including machine-readable instructions, when executed, to implement a method or realize an apparatus as claimed in any preceding example.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided herein are not intended to be limiting.

The invention claimed is:
1. An apparatus comprising:
a trusted execution environment (TEE) comprising a processor and memory coupled to the processor, the memory comprising instructions that when executed by the processor cause the processor to:
generate a public key infrastructure (PKI) key pair comprising a public key and a private key upon loading the TEE, wherein the TEE is unable to publish a block to a blockchain;
generate a TEE context initialization request message comprising a random nonce and blockchain-specific data;
sign the TEE context initialization request message using the private key; and
transmit the TEE context initialization request message to one or more peer nodes of a peer-to-peer (P2P) network;
wherein the TEE performs a bootstrap operation to enable a block to be published to the blockchain based on one or more response messages received from the one or more peer nodes.

2. The apparatus of claim 1, further comprising an untrusted portion comprising a second processor and a second memory, the second memory comprising second instructions that when executed by the second processor cause the processor to restart and load the TEE.

3. The apparatus of claim 1, the TEE memory further comprising instructions that when executed by the processor cause the processor to generate an attestation report comprising:
a quote signed by a processor-specific attestation key, the quote comprising:
attributes of the TEE; and
a measurement of the TEE's initial state; and
the public key.

4. The apparatus of claim 1, the TEE memory further comprising instructions that when executed by the processor cause the processor to:
receive a response message of a peer node, wherein the response message is signed by a second private key of the peer node; and
verify that a value embedded in the response message is the nonce.

5. The apparatus of claim 4, the TEE memory further comprising instructions that when executed by the processor cause the processor to:
retrieve an attestation report from the response message, wherein the attestation report contains a second public key of the peer node; and
verify the response message using the second public key.

6. The apparatus of claim 5, the TEE memory further comprising instructions that when executed by the processor cause the processor to:
receive additional response messages from additional peer nodes of the P2P network; wherein the TEE verifies each of the additional response messages.

7. The apparatus of claim 6, the TEE memory further comprising instructions that when executed by the processor cause the processor to employ TEE context restoration based on the response message and the additional response messages.

8. The apparatus of claim 1, the TEE memory further comprising instructions that when executed by the processor cause the processor to download a portion of the blockchain from the peer.

9. An apparatus comprising:
a trusted execution environment (TEE), comprising a processor and memory coupled to the processor, the memory comprising instructions that when executed by the processor cause the processor to:
receive a TEE context initialization request message from a recovering node, the TEE context initialization request message comprising:
a random nonce; and
an attestation report comprising a quote signed by a processor-specific attestation key, the quote comprising:
attributes of a recovering node TEE; and
a measurement of the recovering node TEE's initial state; and
a public key of the recovering node;
wherein the TEE provides a response message in response to determining that the recovering node TEE is valid.

10. The apparatus of claim 9, the TEE memory further comprising instructions that when executed by the processor cause the processor to contact an attestation service to confirm that the attestation report is from a valid TEE.

11. The apparatus of claim 9, the TEE memory further comprising instructions that when executed by the processor cause the processor to open the TEE context initialization request message using the public key of the recovering node.

12. The apparatus of claim 11, the TEE memory further comprising instructions that when executed by the processor cause the processor to:
generate a public key infrastructure (PKI) key pair comprising a public key and a private key; and
generate a response message containing:
the random nonce;
a blockchain snapshot; and
a peer attestation report;
wherein the response message is signed using the private key.

13. The apparatus of claim 12, wherein the peer attestation report comprises a peer quote comprising:
attributes of a peer node TEE; and
a measurement of the peer node TEE's initial state;
wherein the peer quote is signed by a processor-specific peer attestation key of the peer node.

14. The apparatus of claim 13, the TEE memory further comprising instructions that when executed by the processor cause the processor to:
send a portion of a blockchain to the recovering node in response to determining that the recovering node TEE is valid.

15. At least one non-transitory machine-readable storage medium comprising instructions that, when executed by a processor, cause the processor to:
generate a public key infrastructure (PKI) key pair comprising a public key and a private key upon loading a trusted execution environment (TEE), wherein the TEE is unable to publish a block to a blockchain;
generate a TEE context initialization request message comprising:
a random nonce; and
blockchain-specific data;
sign the TEE context initialization request message using the private key; and
transmit the TEE context initialization request message to one or more peer nodes of a peer-to-peer (P2P) network;
wherein the TEE performs a bootstrap operation to enable a block to be published to the blockchain based on one or more response messages received from the one or more peer nodes.

16. The at least one non-transitory machine-readable storage medium of claim 15, comprising instructions that further cause the processor to generate an attestation report comprising:
a quote signed by a processor-specific attestation key, the quote comprising:
attributes of the TEE; and a measurement of the TEE's initial state; and
the public key.

17. The at least one non-transitory machine-readable storage medium of claim 15, comprising instructions that further cause the processor to:
   receive a response message of a peer node, wherein the response message is signed by a second private key of the peer node; and
   verify that a value embedded in the response message is the random nonce.

18. The at least one non-transitory machine-readable storage medium of claim 17, comprising instructions that further cause the processor to:
   retrieve an attestation report from the response message, wherein the attestation report contains a second public key of the peer node; and
   verify the response message using the second public key.

19. The at least one non-transitory machine-readable storage medium of claim 18, comprising instructions that further cause the processor to:
   receive additional response messages from additional peer nodes of the P2P network;
   wherein the TEE verifies each of the additional response messages.

20. The at least one non-transitory machine-readable storage medium of claim 19, comprising instructions that further cause the processor to:
   employ TEE context restoration based on the response message and the additional response messages; and
   download a portion of the blockchain from the peer.

* * * * *